United States Patent
Salvador et al.

(10) Patent No.: US 9,602,454 B2
(45) Date of Patent: *Mar. 21, 2017

(54) SYSTEMS AND METHODS FOR SENDING DIGITAL IMAGES

(71) Applicant: Apple Inc., Cupertino, CA (US)

(72) Inventors: Richard H. Salvador, Santa Monica, CA (US); Steve G. Salvador, Santa Monica, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/923,659

(22) Filed: Oct. 27, 2015

(65) Prior Publication Data
US 2016/0050171 A1  Feb. 18, 2016

Related U.S. Application Data

(63) Continuation of application No. 14/179,920, filed on Feb. 13, 2014, now Pat. No. 9,189,682.

(51) Int. Cl.
*H04L 12/58* (2006.01)
*G06K 9/00* (2006.01)
*G06F 17/30* (2006.01)

(52) U.S. Cl.
CPC ........ *H04L 51/08* (2013.01); *G06F 17/30247* (2013.01); *G06K 9/00221* (2013.01); *G06K 9/00288* (2013.01); *H04L 51/28* (2013.01); *G06K 2009/00328* (2013.01); *G06K 2209/27* (2013.01)

(58) Field of Classification Search
CPC .... G06F 17/30247; G06K 2009/00328; G06K 2209/27; G06K 9/00221; G06K 9/00288
USPC ....................................................... 382/100
See application file for complete search history.

(56) References Cited

U.S. PATENT DOCUMENTS

| 8,520,907 | B2 | 8/2013 | Lai |
| 9,189,682 | B2 | 11/2015 | Salvador et al. |
| 2003/0078968 | A1 | 4/2003 | Needham |
| 2003/0200268 | A1 | 10/2003 | Morris |

(Continued)

OTHER PUBLICATIONS

"U.S. Appl. No. 14/179,920, Notice of Allowance mailed Jul. 10, 2015", 9 pgs.

(Continued)

*Primary Examiner* — Manuchehr Rahmjoo
(74) *Attorney, Agent, or Firm* — Chia-Hsin Chu; Page Ponsford; DLA Piper LLP US

(57) ABSTRACT

Facial recognition algorithms may identify the faces of one or more people in a digital image. Multiple types of communication may be available for the different people in the digital image. A user interface may be presented indicating recognized faces along with the available forms of communication for the corresponding person. An indication of the total number of people available to be communicated with using each form of communication may be presented. The user may have the option to choose one or more forms of communication, causing the digital image to be sent to the recipients using the selected forms of communication. An individual may have provided information for facial recognition of the individual to a service. Based on the information, the service may recognize that the individual is in an uploaded picture and send the digital image to the user account of the individual.

18 Claims, 15 Drawing Sheets

(56) References Cited

U.S. PATENT DOCUMENTS

| | | |
|---|---|---|
| 2012/0242840 A1 | 9/2012 | Nakfour et al. |
| 2013/0101181 A1 | 4/2013 | Hsi |
| 2014/0161326 A1 | 6/2014 | Ganong et al. |
| 2015/0227782 A1 | 8/2015 | Salvador et al. |

OTHER PUBLICATIONS

"Samsung announces buddy share feature, automatically sends photos to friends and family for you", Engadget Mobile, (May 3, 2012), 3 pgs.

Vazquez-Fernandez, E., et al., "Built-in face recognition for smart photo sharing in mobile devices", 2011 IEEE International Conference on Multimedia and Expo (ICME), (2011), 1-4.

SYSTEMS AND METHODS FOR SENDING DIGITAL IMAGES

PRIORITY CLAIM

The application claims priority to U.S. patent application Ser. No. 14/179,920, filed Feb. 13, 2014, entitled "Systems and Methods for Sending Digital Images," which is incorporated herein by reference in its entirety.

TECHNICAL FIELD

This application relates generally to data processing, and more specifically to systems and methods for sending digital images over a network.

BACKGROUND

A user may use a mobile device to take a picture. The picture may be sent from the user's mobile device to other users via email or text-message by a communication application. Sending the picture may include selecting the recipients and selecting the image to send.

BRIEF DESCRIPTION OF THE DRAWINGS

Some embodiments are illustrated by way of example and not limitation in the figures of the accompanying drawings in which.

DEFINITIONS

Figure 1:
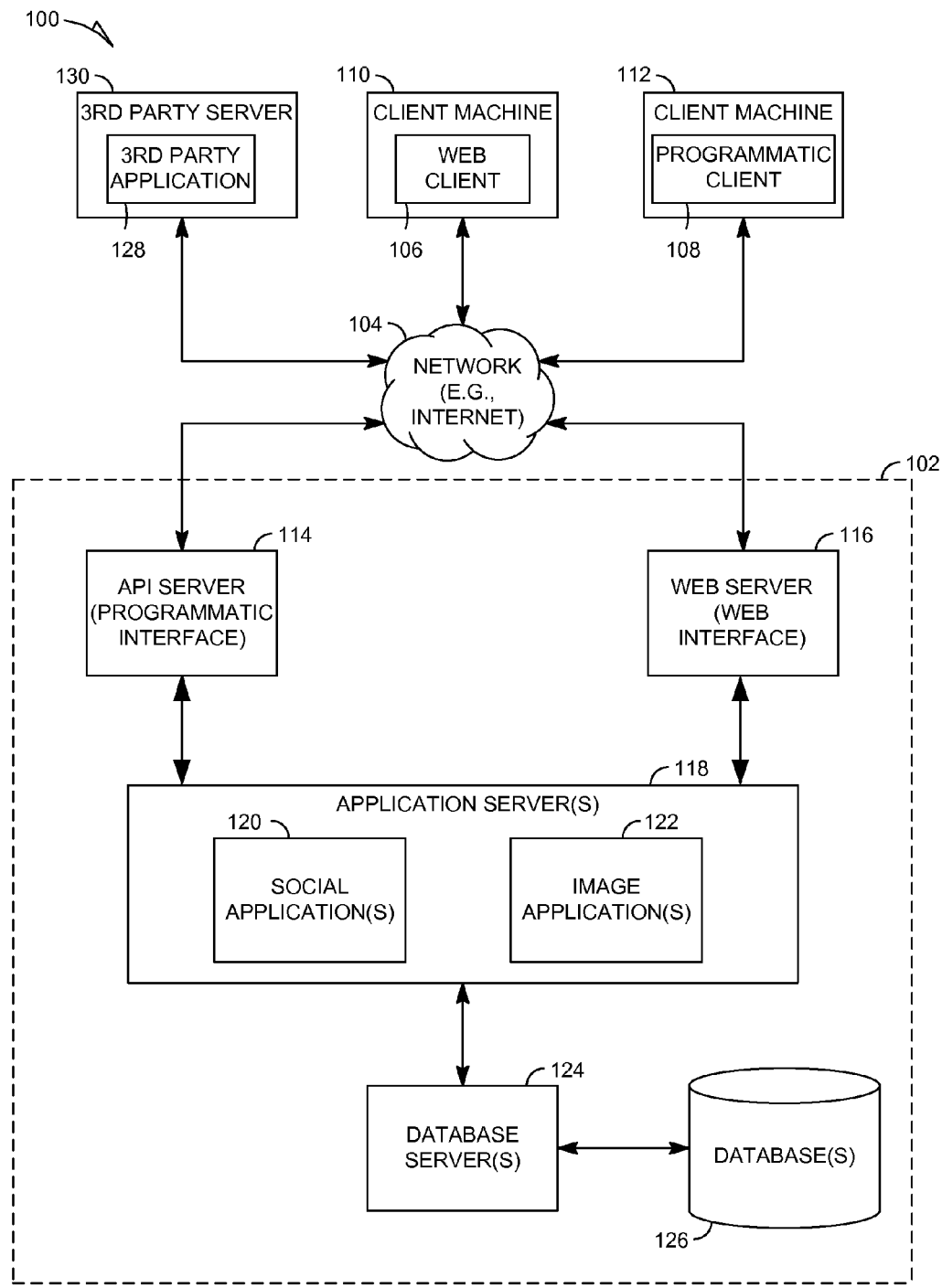
FIG. 1 is a block diagram depicting a system for sending digital images, according to an example embodiment.

As used herein, a "database" is a data storage resource and may store data structured as a text file, a table, a spreadsheet, a relational database (e.g., an object-relational database), a triple store, a hierarchical data store, or any suitable combination thereof.

As used herein, a "photo" is an image captured by a camera (e.g., a two-dimensional camera, a three-dimensional camera, an infrared camera) while a "picture" is a digital image, regardless of origin. Photos and pictures may be stored as raster images, vector images, constellations of points, or in other ways. Discussion below related to photos applies equally well to non-photo pictures, unless specifically stated otherwise.

DETAILED DESCRIPTION

A user may have a picture of one or more people. The picture can be stored on a computing device (e.g., a laptop computer, a desktop computer, a server computer, a smart phone, or a tablet). The picture can be a photo that was taken by the computing device or transferred to the computing device from another source. For example, the picture may have been taken by a smart phone and be stored on the smart phone, transferred to a desktop computer via a cable (e.g., a universal serial bus ("USB") cable), or transferred to a server computer over a network. Facial recognition algorithms may identify the faces of one or more people in the picture. Information about the people in the picture may be accessed (e.g., from a contact information database). Based on the information about the people in the picture, the picture may be sent to one or more of the people in the picture. For example, an email may be sent to email addresses for the people in the picture, including the picture as an attachment.

The user may be presented with options to select the recipients of the picture. For example, identified people may be pre-selected and the user presented with the option to de-select them to avoid sending the picture to them. As another example, contact information for recognized faces lacking contact information may be added by the user, or existing contact information updated. Addresses of individuals not in the picture may also be added to a recipient list and the picture sent to those individuals as well as the identified individuals.

Multiple types of communication may be available. For example, email, short message service ("SMS") messaging, and posting to a social network may all be available. A contact database may contain addresses for different types of communication for the different people in the picture. For example, an email address may be the only address known for a first person, while a mobile phone number suitable for receiving SMS messages may be the only address known for a second person. A user interface may be presented indicating which forms of communication are available for different identified people. For example, recognized faces may be indicated (e.g., enclosed in a box or highlighted) along with icons indicating the available forms of communication for the corresponding person. A user interface may be presented indicating the total number of people available to be communicated with using each form of communication. The user may have the option to choose one or more forms of communication, causing the picture to be sent to the recipients using the selected forms of communication. In this example, each contact within a contact database can have a default communication mechanism for sharing data such as pictures.

Different algorithms for facial recognition may be used. One method, known as "eigenfaces", projects face images onto a feature space derived through Principal Component Analysis (PCA). This feature space represents the axes with the maximum variance, or eigenvectors, of the image. The system is trained by projecting identified face images onto the eigenfaces feature space. The resulting projections, which is a vector of weights for each eigenface, are stored along with a label for each trained face. These weight vectors may be computed and stored on the mobile device. The weight vectors may also be computed in another application, such as the desktop iPhoto application, and imported into the user's mobile device through cloud syncing. This allows the mobile application to use precomputed training data and perform facial recognition without the user having to train the mobile application first. When a new face is presented as a query to the system, the new face image is projected onto the eigenfaces feature space, and its projection is compared to the stored projections from the training set. The closest projection is found and the label associated with it represents the predicted face for the query image.

In certain examples, a user can utilize a desktop picture (image) organization tool, such as iPhoto™ (from Apple Computer, Inc. of Cupertino, Calif.). The desktop organization tool can include the ability to perform facial recognition across an entire database of pictures, or on a selected set of pictures. The desktop organization tool can store facial recognition data for use in recognizing previously identified faces. Facial recognition data can be associated with contacts in a contact database, which allows the picture organization tool to automatically tag contacts within pictures using previously trained facial recognition data. In an example, contacts containing previously trained facial recognition data can be synchronized, via a central server system, to a mobile device capable of taking new photos. Once synchronized, the mobile device can utilize the pre-trained facial recognition data to recognize faces within newly taken pictures. Subsequently, the contact information associated with the pre-trained facial recognition data can be used to share the newly captured photo with known users according to the examples discussed herein.

Additionally or alternatively, the picture may be sent to individuals in the picture separate from the selection of recipients by the user. For example, the picture may be uploaded to a photo-sharing service or social network service of which the individual is a member. The individual may have provided information for facial recognition of the individual to the service, such as through synchronization with a mobile computing device or desktop computing device having pre-trained facial recognition data associated with a user's contact database. Based on the information, the service may recognize that the individual is in the uploaded picture and send the picture to the user account of the individual. Furthermore, this may be an opt-in service selectable by the individual.

EXAMPLE SYSTEM

FIG. 1 is a network diagram depicting a client-server system 100, within which one example embodiment can be deployed. A networked system 102, in the example forms of a network-based system that provides server-side functionality, via a network 104 (e.g., the Internet or Wide Area Network (WAN)) to one or more clients, such as client 110 or client 112. FIG. 1 illustrates, for example, a web client 106 (e.g., a browser), and a programmatic client 108 executing on respective client machines 110 and 112.

An Application Program Interface (API) server 114 and a web server 116 are coupled to, and provide programmatic and web interfaces respectively to, one or more application servers 118. In this example, the application servers 118 host one or more social applications 120 and image applications 122. The application servers 118 are, in turn, shown to be coupled to one or more databases servers 124 that facilitate access to one or more databases 126.

The social applications 120 may provide a number of social functions and services to users that access the networked system 102. The image applications 122 may provide a number of image services and functions to users. The image applications 122 may allow users to store images, modify images, delete images, and send images to other users, including via the social applications 120. While the social and image applications 120 and 122 are shown in FIG. 1 to each form part of the networked system 102, it will be appreciated that, in alternative embodiments, the image applications 122 may form part of an image service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various social and image applications 120 and 122 could also be implemented as standalone software programs, which do not necessarily have networking capabilities.

The web client 106 accesses the various social and image applications 120 and 122 via the web interface supported by the web server 116. Similarly, the programmatic client 108 accesses the various services and functions provided by the social and image applications 120 and 122 via the programmatic interface provided by the API server 114. The programmatic client 108 may, for example, be a photo application (e.g., the iPhoto™ application developed by Apple Inc., of Cupertino, Calif.) to enable users to take and manage photos on the networked system 102 in an off-line manner, and to perform batch-mode communications between the programmatic client 108 and the networked system 102.

The image application 122 can perform facial recognition, identifying faces in images. Alternatively or additionally, the client machine 110 or 112 can perform facial recognition. The image application 122 may also synchronize facial recognition data between multiple clients. For example, one client machine 110 or 112 may provide a picture of a user along with identification of the user in the picture. Later, another client machine 110 or 112 may provide another picture of the same user. Based on the earlier-obtained image and facial-recognition data generated from that image, the user in the second picture may be identified automatically.

The facial recognition data can also be synchronized between the image application 122 and the social application 120. For example, a user may upload a photo of themselves to the social application 120. The social application 120 can transfer the photo of the user to the image application 122. The image application 122 can use the photo of the user to generate facial recognition data. The facial recognition data can be used by the image application 122 to recognize the user in other photos. The image application 122 can provide other photos containing the user to the social application 120. The social application 120 can add the other photos containing the user to the social account of the user, for example, for display to friends of the user. As another example, the social application 120 can transfer all uploaded photos to the image application 122. The image application 122 can identify users in photos based on facial recognition data derived from photos provided by the users themselves, derived from photos provided by other users also providing user identification data, or derived from another source (e.g., a photo identification database, such as a driver's license database, mug shot database, or the like).

The client machine 110 or 112 may present information to a user. For example, the client machine 110 may be running a web browser presenting a web page. The user may be a photographer, and the web page may present the photographer with options to upload pictures, download pictures, delete pictures, and send pictures, among other possible functions. The user may be a user of a social network, and the web page may present the user with options to configure the user's relationship with other users (e.g., friends, ignore, none), to update contact information (e.g., physical address, email address, phone number, user names on other social networks), to update privacy settings, etc.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more social or image functions that are supported by the relevant applications of the networked system 102.

EXAMPLE MODULES

Figure 2:
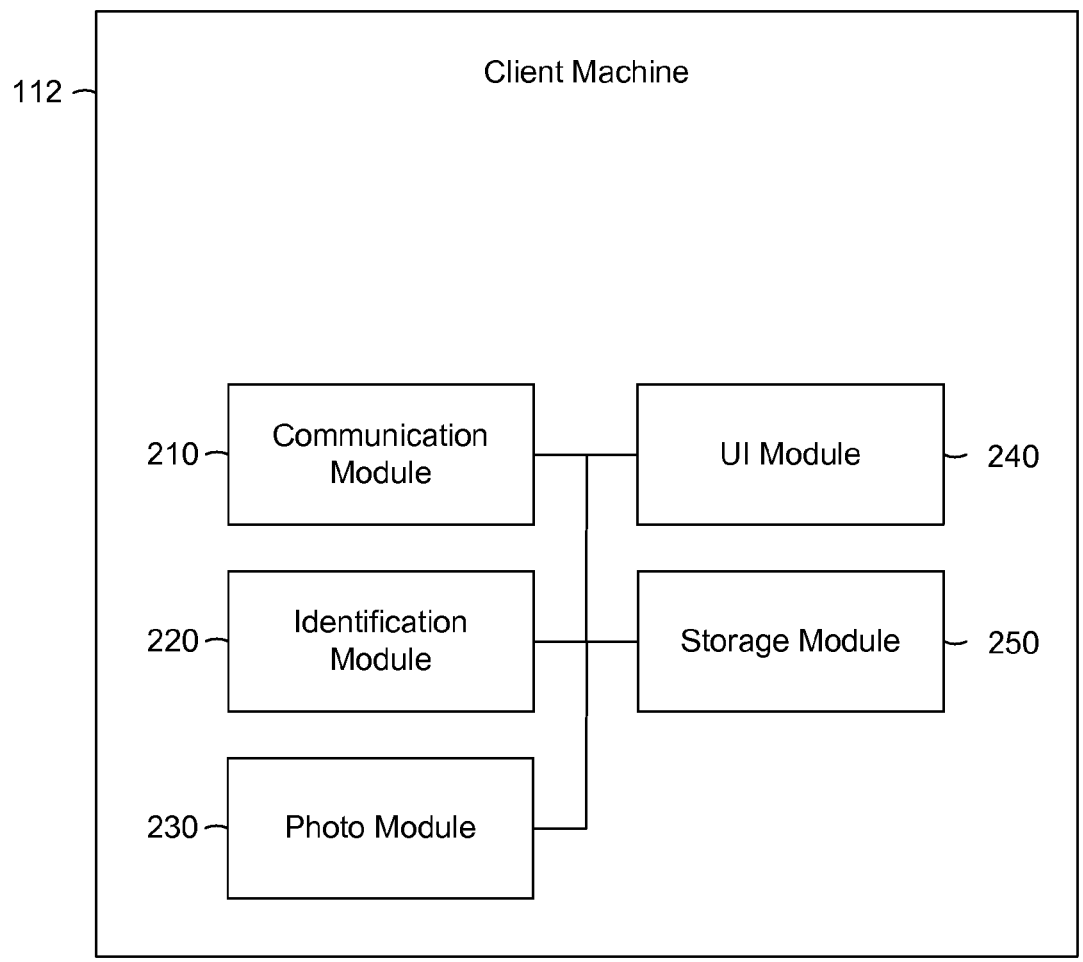
FIG. 2 is a block diagram illustrating a client machine for sending digital images, according to an example embodiment.

FIG. 2 is a block diagram illustrating modules 210-250 of a client machine 112 suitable for sending pictures, according to an example embodiment. The client machine 112 is shown as including a communication module 210, an identification module 220, a photo module 230, a user interface ("UI") module 240, and a storage module 250, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The photo module 230 can control a camera device and take a photo. Alternatively, the communication module 210 may access a photo over a network and provide it to the photo module 230. As another alternative, the photo module 230 may access a photo stored locally via the storage module 250. The identification module 220 may operate on the photo to identify one or more faces in the photo. The identified faces may be correlated to users. For example, a database of known faces and users may be accessed locally via the storage module 250 or remotely via the communication module 210.

A relational database can store records of identified faces. Each record may consist of a name, addresses for various means of electronic communication, and facial recognition data (e.g. a feature vector of weights described above with respect to "eigenfaces"). Furthermore, records may store relationship information and reference other records in the database. Based on the relationship information, users may share photos with contacts related to the people recognized in the photo. For example, when a photo of a person is taken and that person does not have an electronic address, the photo can be sent to a relation that does have an electronic address. This can be useful for sharing photos of children with other parents, where the children themselves do not have an electronic address but can be identified by the facial recognition software.

The UI module 240 can present a UI to the user of the client device 112. For example, the photo may be presented on a display device along with an indication of the identified faces or users corresponding to the identified faces. The UI may include options for sending the photo to one or more of the identified users. For example, email addresses for the identified users may be shown and the user of the client device 112 presented with an option to send the photo to one or more of the identified users. The user of the client device 112 may also be presented with options to send the photo to users not in the photo, such as by adding additional email addresses to a pre-addressed message sharing the photo with recognized users.

The UI module 240 may also present the option to provide information for a face not associated with a known user. For example, an unknown face may be highlighted and a prompt presented to allow the input of a name and address for the user corresponding to the face. The facial recognition data for the face may be stored in association with the name and address for the face. For example, a record in a database with a facial recognition data field, a name field, and an address field can be created or updated. More or fewer fields may be present. The database may be stored on the client machine 110 or 112, or on the server 118. In some example embodiments, the client machine 110 or 112 accesses the server 118 to retrieve facial recognition data for facial recognition on the client machine 110 or 112. In other example embodiments, the client machine 110 or 112 accesses the server 118 to transmit an image for facial recognition on the server 118.

As another example process, a user may enter an email address or phone number for a recognized face not associated with any contact information. Using the provided contact information, the face may be correlated to a record containing additional information. For example, the user may have a contact database with fields for names, addresses, phone numbers, email addresses, occupations, and birthdate. When the user enters the email address corresponding to the recognized face, the record containing that email address can be looked up, and the facial recognition data for the face added to it. Thus, the facial recognition data for the face can be correlated to all known information about the pictured individual, and not just to the contact information provided by the user of the client machine 110 or 112. Furthermore, if the same individual is recognized in a later photo, the user may be presented with all known communication options for communicating with that individual. For example, in the original picture, the individual may have been unrecognized. The user may have then entered an email address, and the image may have been sent to the individual by email. In a later picture, the individual may have been recognized, and both email and phone numbers accessed. Accordingly, the user can be presented with the option of sending the picture by email or SMS.

The communication module 210 can send the photo to the identified users or the users selected via the UI. The sending of the photo may be accomplished by sending a link (e.g., a uniform resource locator ("URL")) to a location on a network where the photo may be accessed, by sending a file containing the photo, or by sending an identifier which may be used to access the photo (e.g., a password that may be entered into an application or web site in order to view the photo).

The UI module 240 can present options related to multiple available communication types. For example, email, SMS messaging, and posting to a social network may all be available. A contact database, accessed by the storage module 250 or the communication module 210, may contain addresses for different types of communication for the different people in the picture. For example, an email address may be the only address known for a first person, while a mobile phone number suitable for receiving SMS messages is the only address known for a second person. A UI may be presented indicating which forms of communication are available for different identified people. For example, recognized faces may be indicated (e.g., enclosed in a box or highlighted) along with icons indicating the available forms of communication for the corresponding person. A UI may be presented indicating the total number of people available to be communicated with using each form of communication. The user may have the option to choose one or more forms of communication, causing the picture to be sent to the recipients using the selected forms of communication.

Additional details regarding the functionality provided by the modules 210-250 are detailed below in reference to FIGS. 10-11.

Figure 3:
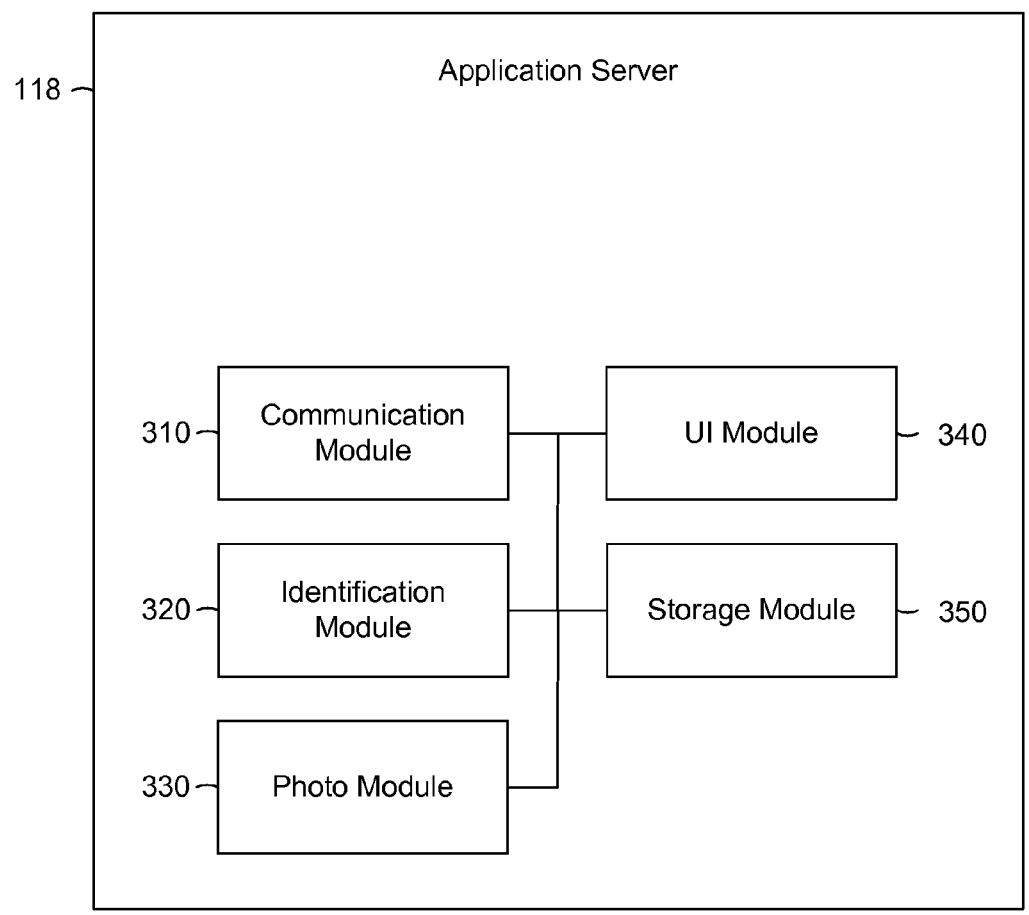
FIG. 3 is a block diagram illustrating an application server for sending digital images, according to an example embodiment.

FIG. 3 is a block diagram illustrating modules 310-350 of an application server 118 suitable for sending pictures, according to an example embodiment. The application server 118 is shown as including a communication module 310, an identification module 320, a photo module 330, a UI module 340, and a storage module 350, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 310 can access a photo over a network and provide it to the photo module 330. Alternatively, the photo module 330 may access a photo stored locally via the storage module 350. The identification module 320 may operate on the photo to identify one or more faces in the photo. The identified faces may be correlated to users. For example, a database of known faces and users may be accessed locally via the storage module 350 or remotely via the communication module 310.

The UI module 340 can cause a UI to be presented to the user of the client device 112. For example, the UI module 340 may send a hypertext markup language ("HTML") page via the communication module 310 to the client device 110 or 112 for presentation to the user by a web browser. The HTML document may include a photo (e.g., via an IMG tag) for presentation on a display device along with an indication of the identified faces or users corresponding to the identified faces. The UI may include options for sending the photo to one or more of the identified users. For example, email addresses for the identified users may be shown and the user of the client device 110 or 112 presented with an option to send the photo to one or more of the identified users. The user of the client device 110 or 112 may also be presented with options to send the photo to users not in the photo. The UI may also present the option to provide information for a face not associated with a known user. For example, an unknown face may be highlighted and a prompt presented to allow the input of a name and address for the user corresponding to the face. The communication module 310 may receive a request via the UI to send the photo to the identified users or the users selected via the UI. The communication module 310 may send the photo to the identified or selected users. The facial recognition data for the face may be stored in association with the name and address for the face. For example, a record in a database with a facial recognition data field, a name field, and an address field can be created or updated. More or fewer fields may be present. The database may be stored on the client machine 110 or 112, or on the server 118. In some example embodiments, the client machine 110 or 112 accesses the server 118 to retrieve facial recognition data for facial recognition on the client machine 110 or 112. In other example embodiments, the client machine 110 or 112 accesses the server 118 to transmit an image for facial recognition on the server 118.

As another example process, a user may enter an email address or phone number for a recognized face not associated with any contact information. Using the provided contact information, the face may be correlated to a record containing additional information. For example, the user may have a contact database with fields for names, addresses, phone numbers, email addresses, occupations, and birthdate. When the user enters the email address corresponding to the recognized face, the record containing that email address can be looked up, and the facial recognition data for the face added to it. Thus, the facial recognition data for the face can be correlated to all known information about the pictured individual, and not just to the contact information provided by the user of the client machine 110 or 112. Furthermore, if the same individual is recognized in a later photo, the user may be presented with all known communication options for communicating with that individual. For example, in the original picture, the individual may have been unrecognized. The user may have then entered an email address, and the image may have been sent to the individual by email. In a later picture, the individual may have been recognized, and both email and phone numbers accessed. Accordingly, the user can be presented with the option of sending the picture by email or SMS.

Additional details regarding the functionality provided by the modules 310-350 are detailed below in reference to FIGS. 12-14.

EXAMPLE USER INTERFACE SCREENS

Figure 4:
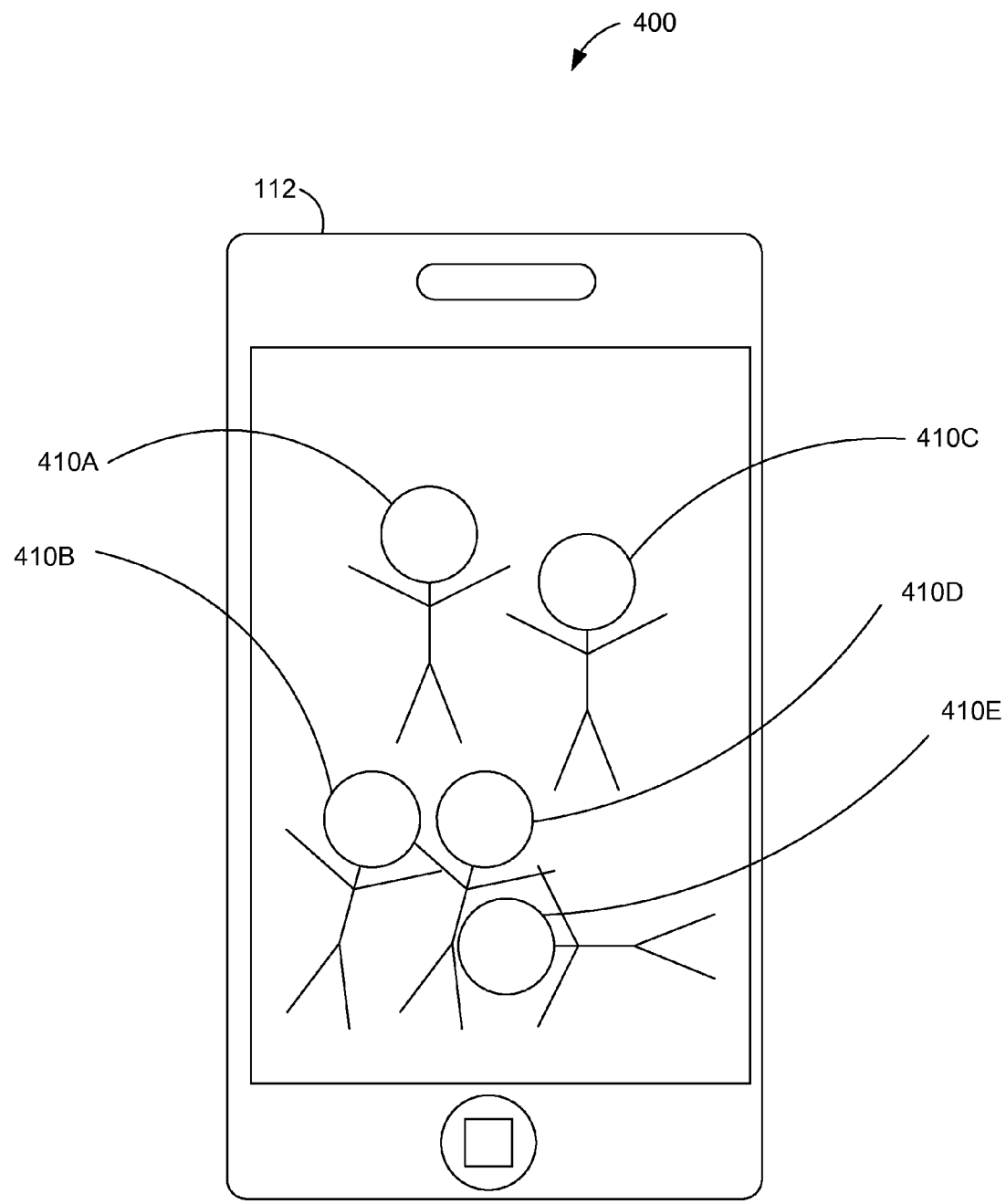
FIGS. 4-9 are block diagrams illustrating user interfaces suitable for sending digital images, according to some example embodiments.

FIG. 4 is a block diagram 400 illustrating a user interface suitable for sending a digital image, according to some example embodiments. The user interface of block diagram 400 may be suitable for presentation to a user (e.g., a user of the client device 110 or 112). As can be seen in block diagram 400, the user interface includes a photo including five individuals 410A, 410B, 410C, 410D, and 410E, which may be collectively referenced as individuals 410.

Figure 5:
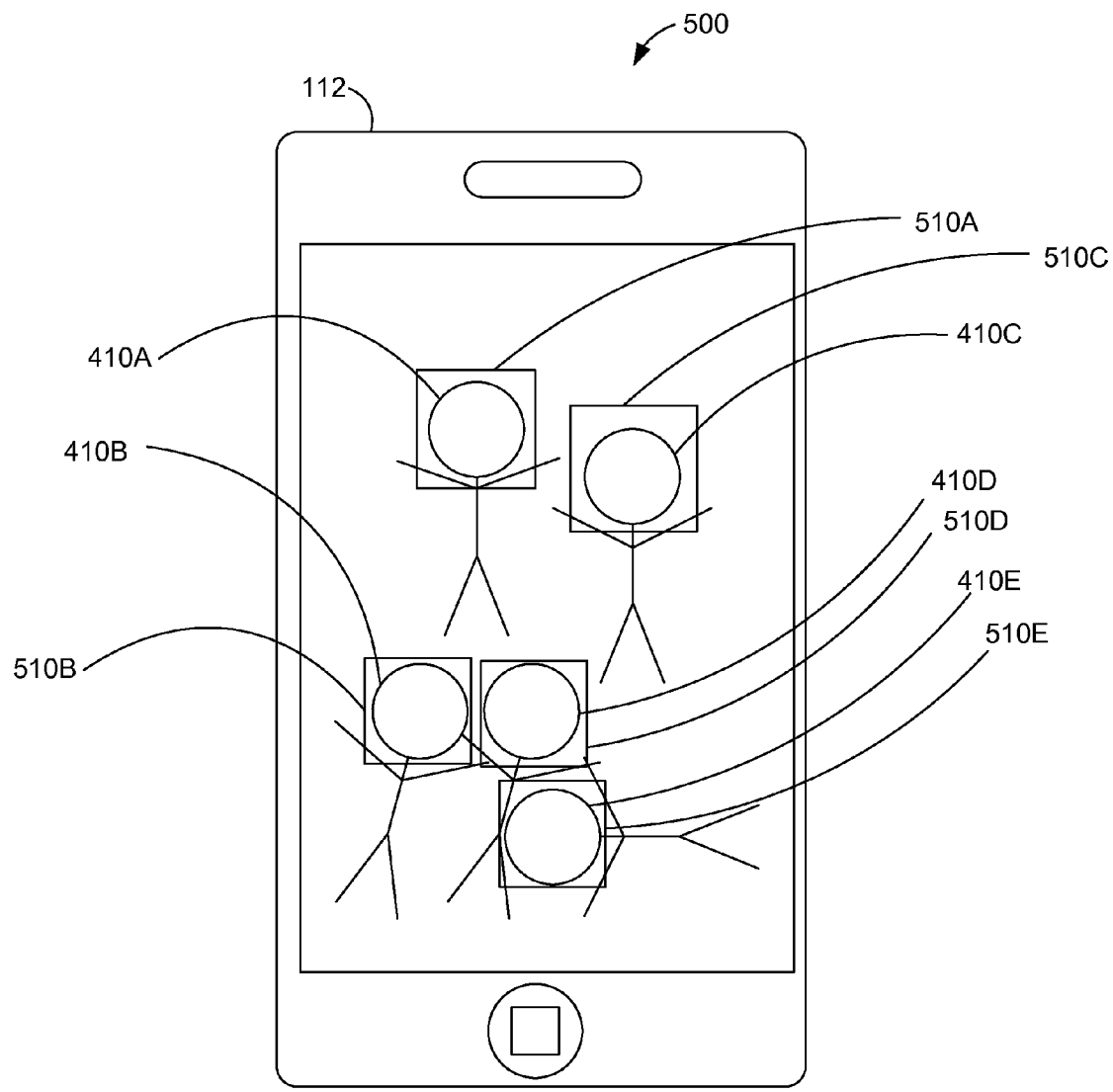

FIG. 5 is a block diagram 500 illustrating a user interface suitable for sending a digital image, according to some example embodiments. The user interface of block diagram 500 may be suitable for presentation to a user (e.g., a user of the client device 110 or 112). In some example embodiments, the UI of FIG. 5 is displayed after the UI of FIG. 4. As can be seen in block diagram 500, the user interface includes a photo including individuals 410 and five boxes 510A, 510B, 510C, 510D, and 510E, which may be collectively referenced as boxes 510. Each of the boxes 510 may indicate a recognized face. Other ways of indicating recognized faces may also be used. For example, different shapes may surround the recognized faces, highlighting may be used (e.g., a lightening of the face or a region around the face), or fadeout may be used (e.g., a darkening of regions other than the faces). In an example, the UI of FIG. 5 can vary the boxes 510 depending upon whether the located face is recognized as being associated with a known contact. For example, a thick border colored green can be used to indicate recognized faces, versus a thinner white or black border around faces that were not recognized by a facial recognition algorithm.

Figure 6:
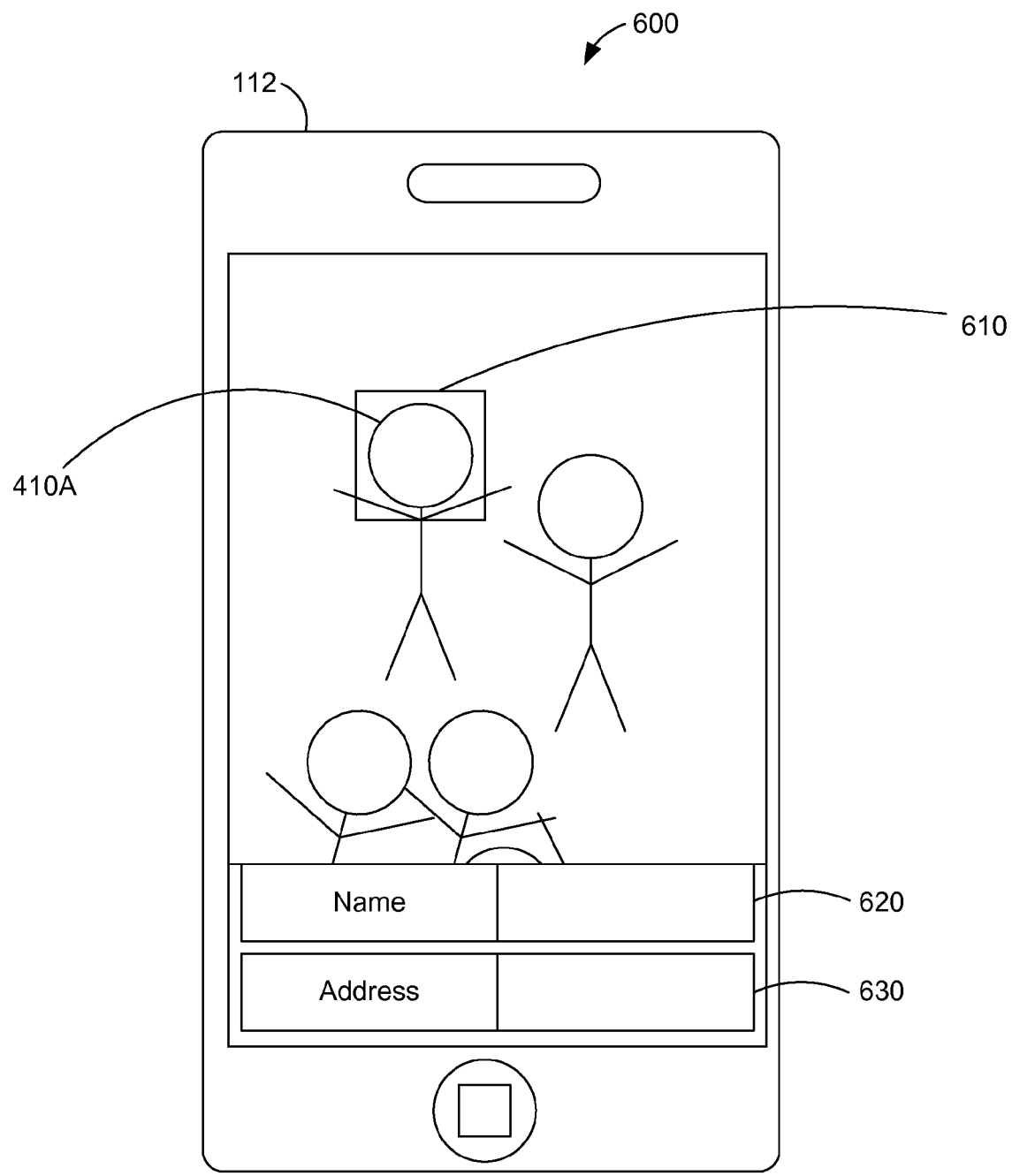

FIG. 6 is a block diagram 600 illustrating a user interface suitable for sending a digital image, according to some example embodiments. The user interface of block diagram 600 may be suitable for presentation to a user (e.g., a user of the client device 110 or 112). In some example embodiments, the UI of FIG. 6 is displayed after the UI of FIG. 4 or FIG. 5, when contact information for a face is not retrieved. As can be seen in block diagram 600, the user interface includes a photo including the individual 410A and a box 610. The box 610 may indicate a recognized face. Other ways of indicating recognized faces may also be used. For example, different shapes may surround the recognized faces, highlighting may be used (e.g., a lightening of the face or a region around the face), or fadeout may be used (e.g., a darkening of regions other than the faces).

The field 620 may be operable to enter a name of the user corresponding to the face indicated by the box 610. For example, the field 620 may be a text-entry field, a drop-down list populated with user names (e.g., names of contacts, friends on a social network, and so on), a button activatable to present another UI, and so on. The field 630 may be operable to enter an address of the user corresponding to the face indicated by the box 610. For example, the field 620 may be a text-entry field, a drop-down list populated with user addresses (e.g., addresses of contacts, user names or handles of friends on a social network, and so on), a button activatable to present another UI, and so on. The address may be an address suitable for electronic communication such as an email address, a phone number capable of receiving text and image messages, a social media address, or the like.

Information created may be stored for future access. For example, a record in a database may be created or updated to correlate the face indicated by the box 610 with the name in the field 620 and the address in the field 630.

The face indicated by the box 610 may be a user for which contact information already exists. For example, a user viewing the UI of FIG. 5 may select (e.g., hover over, touch, or click on) one of the boxes 510. The selected one of the boxes 510 may be highlighted, the other boxes 510 may be removed from the display, or the selection may otherwise be indicated. The selected box may be presented as the box 610 of FIG. 6. The fields 620 and 630 may be populated with the name and address of the user corresponding to the face of the box 610, if they are known. For example, the name and address may be retrieved from a database stored on the client machine 110 or 112, or accessed via the application server 118.

Figure 7:
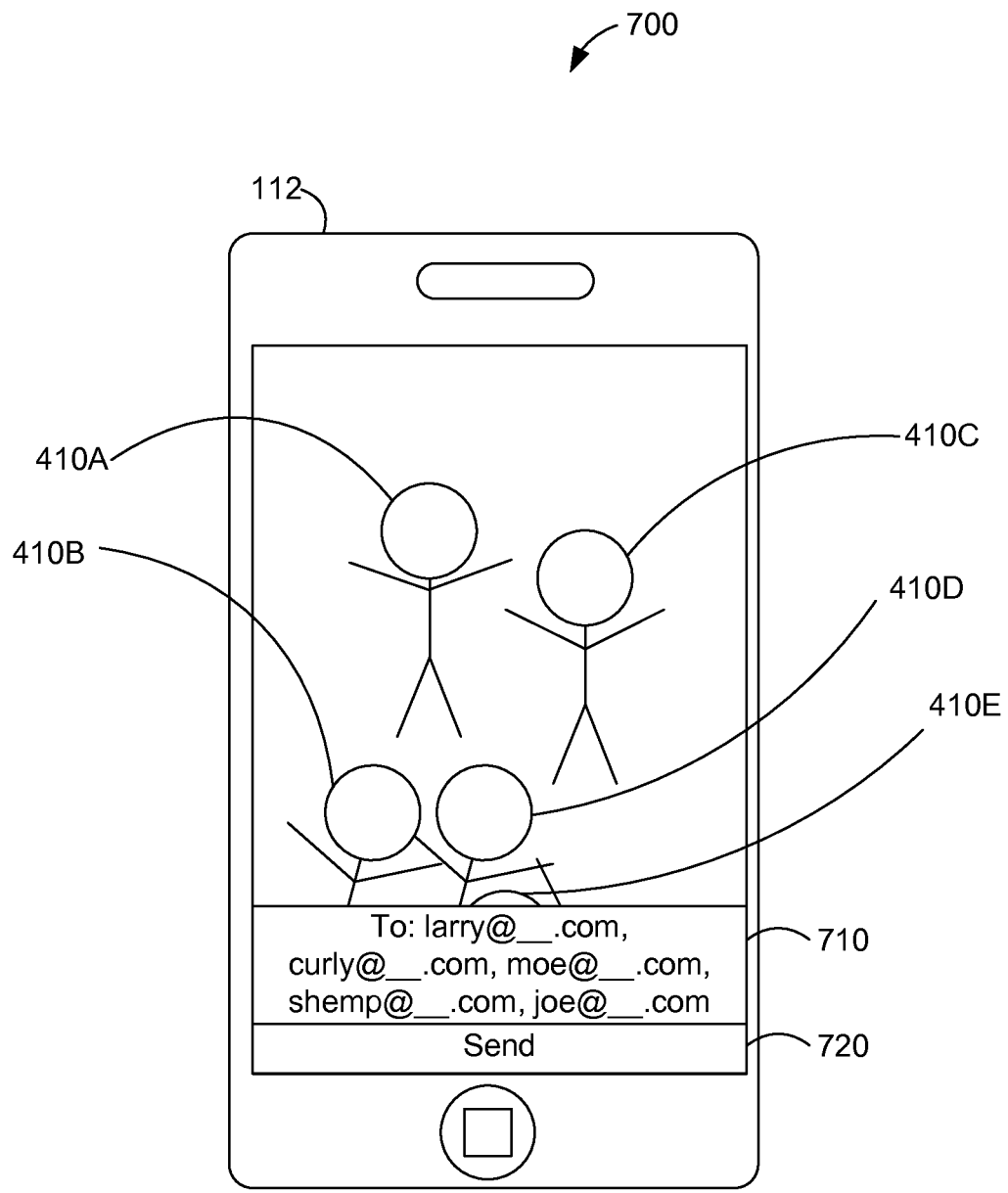

FIG. 7 is a block diagram 700 illustrating a user interface suitable for sending a digital image, according to some example embodiments. The user interface of block diagram 700 may be suitable for presentation to a user (e.g., a user of the client device 110 or 112). As can be seen in block diagram 700, the user interface includes a photo including five individuals 410, an address field 710, and a button 720 labeled "Send."

The address field 710 may be pre-populated with the addresses of the users identified in the photo. The address field 710 may be editable, to allow the addition or deletion of the pre-populated addresses. The button 720 may be operable to send the photo to the addresses in the address field 710. The UI of FIG. 7 can also include the boxes 510 of FIG. 5, showing the identified faces. In such embodiments, the addresses in the address field 710 may be correlated to the boxes 510 or the recognized faces of the individuals 410. For example, if a user clicks on or mouses over a face or a box 510, the corresponding address in the address field 710 may be highlighted or made ready for editing. Similarly, if a user clicks on or hovers over an address in the address field 710, the corresponding face may be highlighted.

Figure 8:
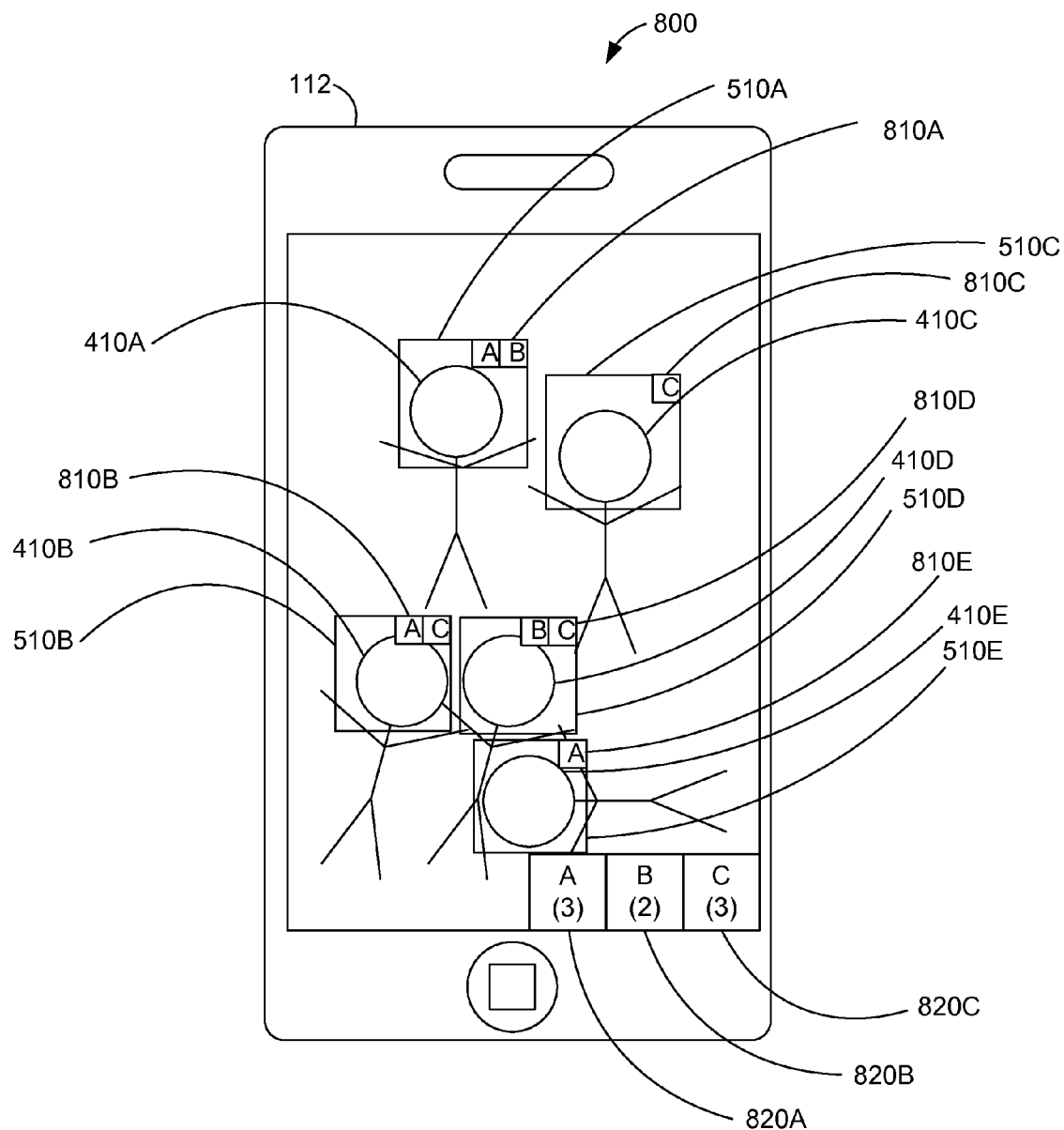

FIG. 8 is a block diagram 800 illustrating a user interface suitable for sending a digital image, according to some example embodiments. The user interface of block diagram 800 may be suitable for presentation to a user (e.g., a user of the client device 110 or 112). As can be seen in block diagram 800, the user interface includes a photo including five individuals 410 and five boxes 510 surrounding the faces of the individuals 410. The block diagram 800 also shows an indicator 810A showing the forms of communication available for individual 410A, an indicator 810B showing the forms of communication available for individual 410B, an indicator 810C showing the forms of communication available for individual 410C, an indicator 810D showing the forms of communication available for individual 410D, and an indicator 810E showing the forms of communication available for individual 410E. The indicators 810A, 810B, 810C, 810D, and 810E may be referred to collectively as indicators 810. Further shown are elements 820A, 820B, and 820C, each operable to cause the sending of the photo via a corresponding form of electronic communication. The elements 820A, 820B, and 820C may be referred to collectively as elements 820.

The indicators 810 may show the forms of communication available for the corresponding individual via icons, text, color-coding, or use another way to display the information. The indicators 810 may be operable to cause the sending of the photo via a corresponding form of electronic communication. For example, the indicator 810A shows an "A" portion and a "B" portion. The "A" portion of the indicator 810A may be operable to send the photo via the same form of electronic communication as element 820A. The "B" portion of the indicator 810A may be operable to send the photo via the same form of electronic communication as element 820B. The portions of the indicators 810 that correspond to the elements 820 may have similar visual appearances to the corresponding elements 820. For example, text, a logo, or a color of the "A" portion of indicator 810A may correspond to text, a logo, or a color of element 820A.

The elements 820 may each indicate a number of users able to be contacted using the corresponding electronic communication method. For example, element 820A may correspond to email. In this case, individuals 410A, 410B, and 410E are able to receive messages by email, as indicated by indicators 810A, 810B, and 810E. The absence of an "A" portion of indicators 810C and 810D may indicate that no email address is known for individuals 410C and 410D. The element 820A may be operable to send the photo to the three users corresponding to the individuals 410A, 410B, and 410E by email. Similarly, element 820B may correspond to SMS text messaging, and be operable to send the photo to the users corresponding to the individuals 410A and 410D by text message. Likewise, element 820C may correspond to a network-based photo-sharing service, and be operable to send a message to the users corresponding to the individuals 410A, 410C, and 410D that contains a link to the photo on the photo-sharing service.

After the form of communication is selected, the user may be prompted to provide address information for the selected form of communication for one or more of the individuals lacking such information. For example, if the element 820A, corresponding, in the example above, to email, is selected, the screen of FIG. 6 may be presented for either or both of individuals 410C and 410D, for whom no email address is known. Alternatively, if the element 820A is selected, an email can be sent to the corresponding address, and a UI can be generated to allow a secondary communication method to be selected, such as 820B or 820C. In the alternative UI, only the two recognized individuals, in this example, individuals 410C and 410D, not having email addresses, would be included for sharing the photo via one of the other available mechanisms. In yet another example, the UI illustrated in FIG. 8 can be re-displayed until all individuals recognized have been sent the photo or the user cancels the operation.

Figure 9:
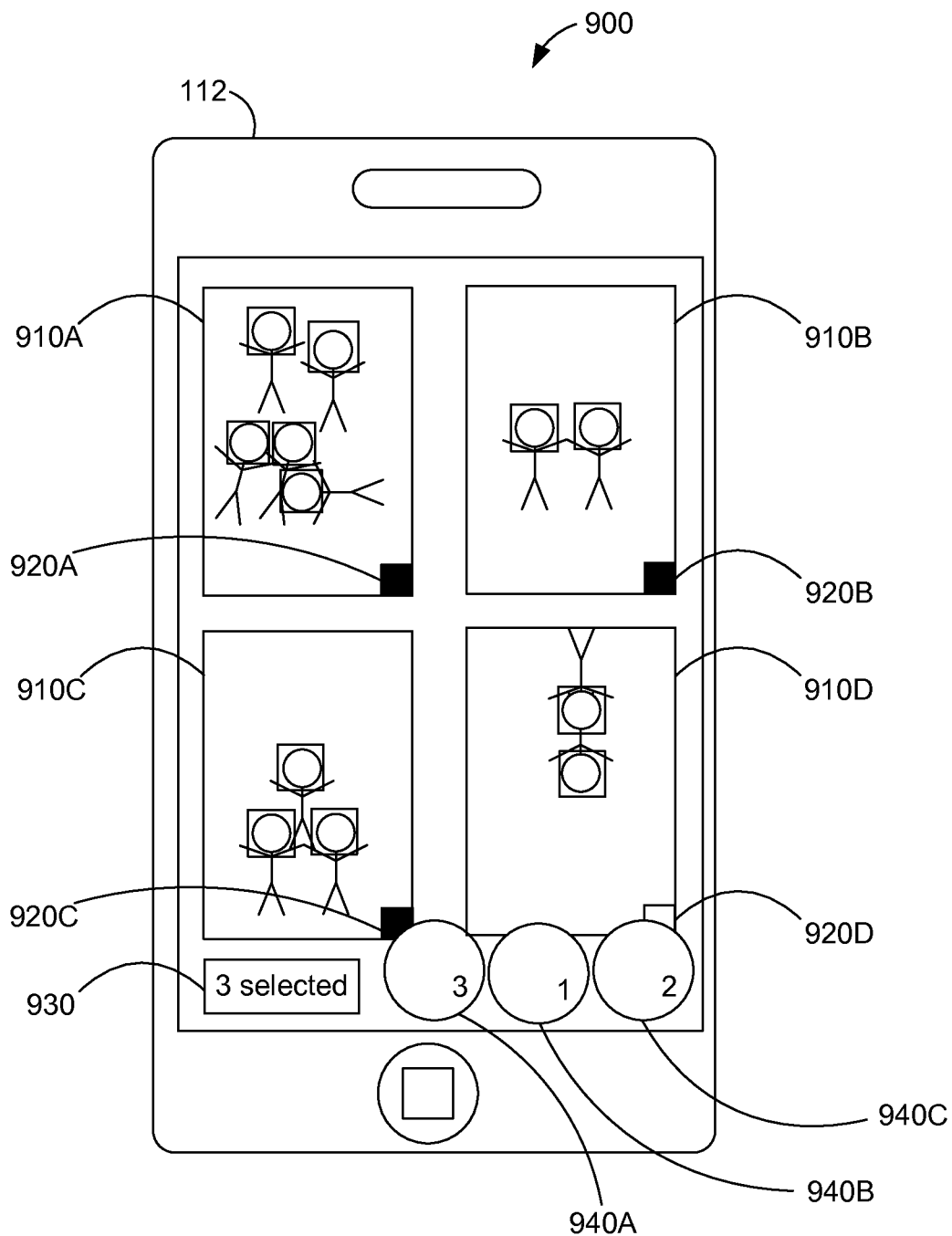

FIG. 9 is a block diagram 900 illustrating a user interface suitable for sending a digital image, according to some example embodiments. The user interface of block diagram 900 may be suitable for presentation to a user (e.g., a user of the client device 110 or 112). As can be seen in block diagram 900, the user interface includes a photo 910A including five individuals with faces indicated by boxes, a photo 910B including two individuals with faces indicated by boxes, a photo 910C including three individuals with faces indicated by boxes, a photo 910D including two individuals with faces by boxes. The four photos 910A-910D may be referred to collectively as photos 910. Also shown in FIG. 9 are four elements 920A, 920B, 920C, and 920D, corresponding to the photos 910A, 910B, 910C, and 910D. The four elements 920A-920D may be referred to collectively as elements 920. The block diagram 900 also shows indicator 930 and elements 940A, 940B, and 940C. The elements 940A-940C may be referred to collectively as elements 940. Each of elements 940 may be operable to cause the sending of the photo via a corresponding form of electronic communication.

As shown, the UI of block diagram 900 presents four photos 910, but more or fewer photos may be shown. More photos may be shown, for example, by shrinking the size of each photo relative to the screen, allowing the user to scroll between photos, and so on. Each of the photos 910 may be stored on the client machine 110 or 112 or accessed over a network. For example, the photos 910 may be thumbnail images transferred to the client machine 110 or 112 over a network from the application server 118, which may have access to higher-resolution versions of the photos 910.

The elements 920 may be operable to select or deselect the corresponding photos 910 for sending. For example, operation of the element 920A can select the photo 910A for sending. The selection or deselection status of the elements 920 may be indicated by filling in the element, as shown by elements 920A, 920B, and 920C, to indicate selection and leaving the element empty, as shown by element 920D, to indicate an unselected status. In an embodiment, the selection or deselection status of the elements 920 is indicated by the placement of a checkmark for selection and an "X" for deselection. In an embodiment, the elements 920 are indicated by the color of the border of the photos 910. For example, a photo 910 may be presented with a green border if the photo is selected for sending and a red border if not. The photos 910 may be initially selected or unselected. The initial status may be determined by a user option, by determining that an address for at least one depicted individual is known, or be a default value for an application.

The indicator 930 may indicate how many photos 910 are selected for sending. As shown, the indicator 930 indicates that three photos 910 are selected for sending, corresponding with the selected status of elements 920A-920C, and the unselected status of 920D. The indicator 930 can also indicate the total number of photos 910 presented.

The elements 940A, 940B, and 940C may correspond to different forms of electronic communication. The elements 940 may indicate the number of recipients for whom addresses are known using the corresponding form of electronic communication. For example, if element 940A corresponds to email, the number "3" in element 940A may indicate that three users in the selected photos 910 have known email addresses. The total number of unique individuals depicted in the selected photos 910 may also be presented. In an embodiment, the number of recipients is presented as a percentage of identified individuals. For example, if the photos 910A-910C, containing a total of ten faces, depict only six different individuals, three of whom have email addresses, element 940A can include an indication of 50%, to indicate that half of the users can be reached by the communication method corresponding to element 940A.

EXAMPLE METHODS

Though arranged serially in the examples of FIGS. 10-14, other examples may reorder the operations, omit one or more operations, and/or execute two or more operations in parallel using multiple processors or a single processor organized as two or more virtual machines or sub-processors. Moreover, still other examples can implement the operations as one or more specific interconnected hardware or integrated circuit modules with related control and data signals communicated between and through the modules. Thus, any process flow is applicable to software, firmware, hardware, and hybrid implementations.

Figure 10:
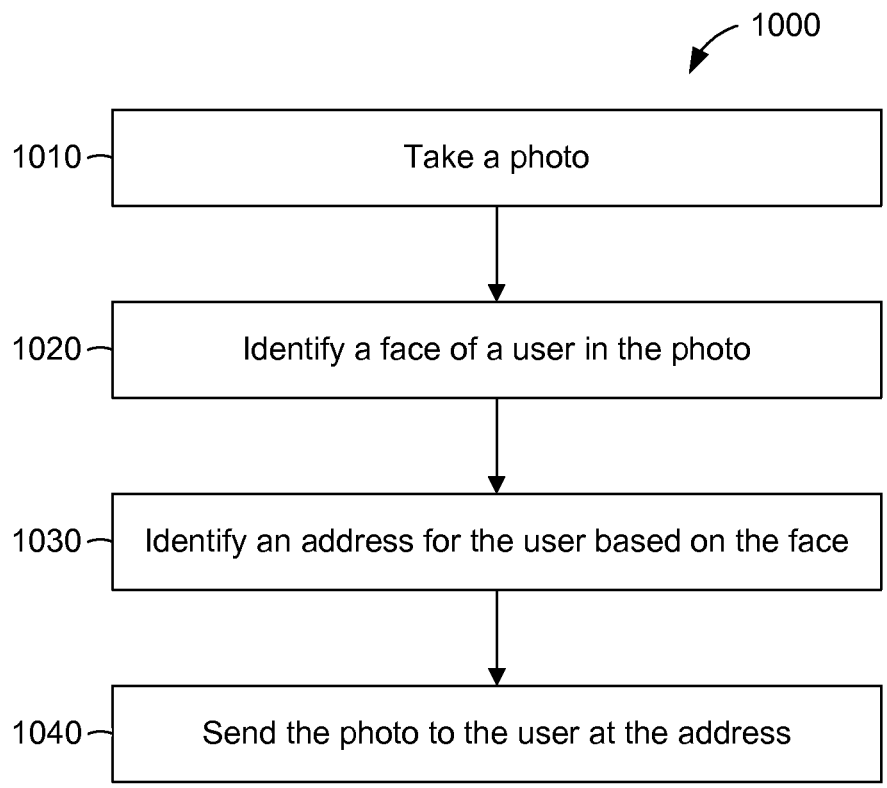
FIGS. 10-14 are flowcharts illustrating methods for sending digital images, according to example embodiments.

FIG. 10 is a flowchart illustrating operations of a client machine 110 or 112 in performing methods of sending a picture, according to some example embodiments. In an example, operations in the method 1000 may be performed by the client machine 110 or 112, using modules described above with respect to FIG. 2. As shown in FIG. 10, the method 1000 includes operations such as taking a photo at 1010, identifying a face at 1020, retrieving an address at 1030, and sending the photo at 1040.

The device may take a photo (operation 1010), for example by using a camera integrated into the device. Alternatively, the camera may be an external peripheral device (e.g., a webcam or a security camera connected wirelessly or via cables to the client machine 110 or 112) or controlled over a network (e.g., a camera integrated into or attached to another computer accessed by the client machine 110 or 112 over a network).

The device may identify a face of a user in the photo (operation 1020), for example by using facial recognition software to recognize the portion of the photo containing the face and comparing the face to known faces (e.g., in a database) to identify the individual corresponding to the face. The facial recognition may occur on the device that took the photo or on another device. For example, the client machine 110 or 112 may capture the photo and upload the photo in whole or in part to a server (e.g., the application server 118). In this example, the server may identify the face for the client.

The device may identify an address for the user based on the face (operation 1030). For example, a database may contain a record for each user. The record for a user may include one or more electronic addresses for the user as well as facial recognition data corresponding to a face of the user. The face (e.g., facial recognition data) may be stored as a raster image, a vector image, as a constellation of points, or in another way useful for a facial recognition engine to recognize matching faces. The address for the user may be retrieved from the record containing the face of the user. The record may be located on a remote server. For example, after sending the photo or a portion thereof to a server, the record for the user, or a portion thereof, may be received. To illustrate, a portion of the photo containing a face may be uploaded to a server, and a communication address received in response. As another illustration, the entire photo may be uploaded to a server, and the server then responds to a plurality of requests from the client, each request requesting a full record for an individual. If multiple electronic addresses are retrieved, the desired subset may be determined based on prioritization of the addresses (e.g., preferring personal email over work email), based on prioritization of the communication method (e.g., preferring email over text messaging), based on user input (e.g., presenting a prompt and allowing the user to select which addresses to use), or some other method.

The device may send the photo to the user at the address (operation 1040). For example, the device may generate an email with the photo as an attachment, generate a multimedia short messaging service ("SMS") message, or generate a post to the user's area of a social network. As another example, a post of the photo can be generated to an area of a social network for the user who took the photo. The posted photo can identify the recognized user, for example, by tagging the recognized user.

Figure 11:
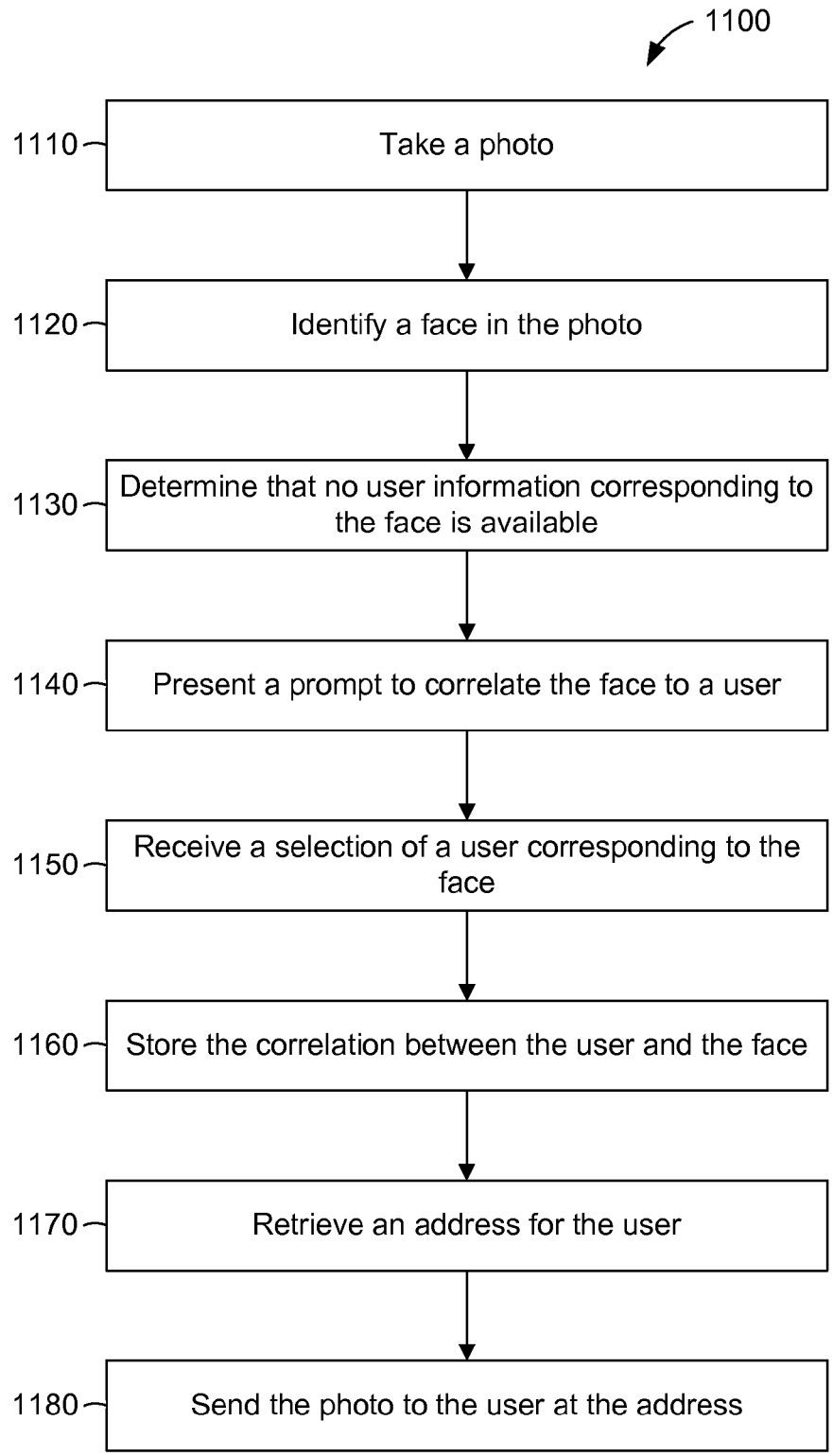

FIG. 11 is a flowchart illustrating operations of a client machine 110 or 112 in performing methods of sending a digital image, according to some example embodiments. Operations in the method 1100 may be performed by the client machine 110 or 112, using modules described above with respect to FIG. 2. As shown in FIG. 11, the method 1100 includes operations such as taking a photo at 1110, identifying a face in the photo at 1120, determining a lack of user information corresponding to the face at 1130, presenting a prompt to correlate the face to a user at 1140, receiving a selection of a user corresponding to the face at 1150, storing the correlation between the face and the user at 1160, retrieving an address for the selected user at 1170, and sending the photo to the user at the address at 1180.

The device may take a photo (operation 1110), for example by using a camera integrated into the device. Alternatively, the camera may be an external peripheral device (e.g., a webcam or a security camera connected wirelessly or via cables to the client machine 110 or 112) or controlled over a network (e.g., a camera integrated into or attached to another computer accessed by the client machine 110 or 112 over a network).

The device may identify a face of a user in the photo or another digital image (operation 1120), for example by using facial recognition software to recognize the portion of the photo containing the face. The device may determine that no user information corresponding to the face is available (operation 1130), for example, by comparing the face to known faces (e.g., in a database) and finding no matches.

The device can present a prompt to correlate the face to a user (operation 1140). For example, the face may be displayed on a display device and known user information may be presented. A UI may be operable to indicate that the presented face belongs to a user for whom other information is stored (operation 1150). The UI may also be operable to enter information for a new user for whom no information is stored. For example, the UI of FIG. 6 may be displayed for an identified individual 410A for whom no information is stored. The information for the new user may be entered into the fields 620 and 630 of FIG. 6. A new or updated record for the user can be stored, indicating that the user is correlated to the face (operation 1160).

The device can retrieve an address for the user based on the face (operation 1170). If multiple addresses are retrieved, the desired subset may be determined based on prioritization of the addresses (e.g., preferring personal email over work email), based on prioritization of the communication method (e.g., preferring email over text messaging), based on user input (e.g., presenting a prompt and allowing the user to select which addresses to use), or some other method.

The device may send the photo to the user at the address (operation 1180). For example, the device may generate an email with the photo as an attachment, generate a multimedia short messaging service ("SMS") message, or generate a post to the user's area of a social network.

Figure 12:
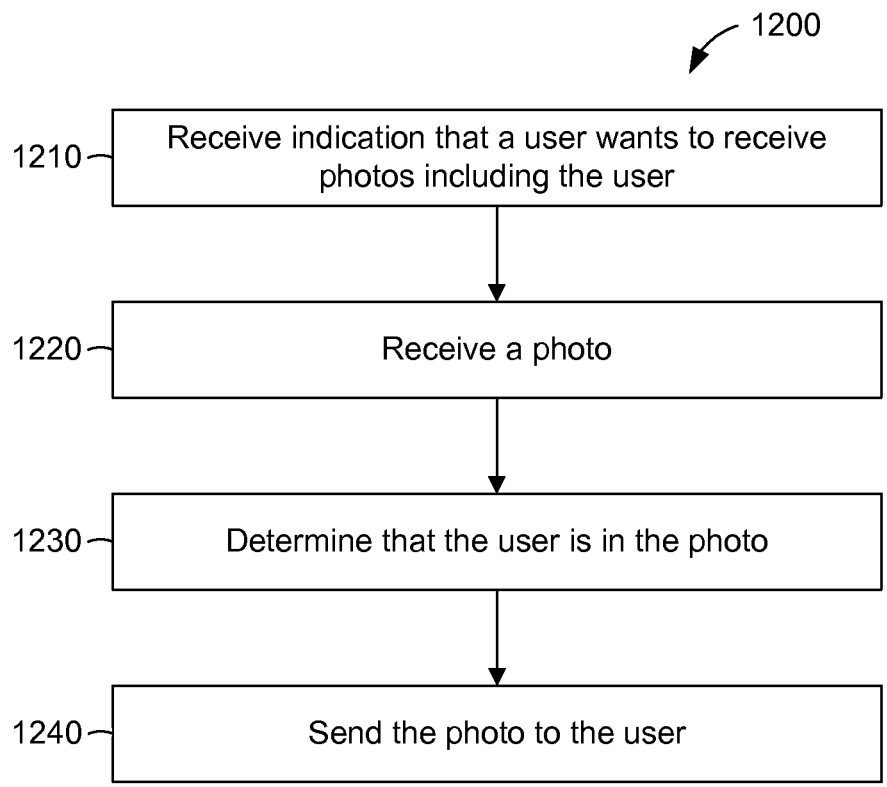

FIG. 12 is a flowchart illustrating operations of an application server 118 in performing methods of sending a picture, according to some example embodiments. Operations in the method 1200 may be performed by the application server 118, using modules described above with respect to FIG. 3. As shown in FIG. 12, the method 1200 includes operations such as receiving an indication that a user wants to receive photos in which the user is depicted at 1210, receiving a photo at 1220, determining that the user is depicted in the photo at 1230, and sending the photo to the user at 1240.

The application server 118 may receive an indication that a user wants to receive photos including the user (operation 1210). For example, the application server 118 may be providing a photo-sharing application that allows users to upload photos. The photo-sharing application may determine on a user-by-user basis which photos the user may view, provide a user-based viewing area of photos uploaded or selected by the user, or otherwise organize and control permissions for the photos. The user may be presented options to configure interaction with the photo-sharing application. For example, photos uploaded by the user may be public or private by default, the user may wish to have his/her name associated with photos containing the user or prefer not to be named, and so on. The user may upload a picture and indicate that the picture contains the user's face. The user's face may be used for facial recognition by the photo-sharing application. Alternatively, other users may indicate that other pictures contains the user's face. The other pictures may be used for facial recognition in addition to or instead of an image uploaded by the user.

The application server 118 may receive a photo (operation 1220). For example, an uploading user may upload a photo to a photo-sharing application. The uploading user may not know all of the individuals in the photo. For example, a photo may be taken at a party, a conference, or a reunion, with many people in the photo, few of whom are known to the photographer.

The application server 118 may determine that the user is in the photo (operation 1230). For example, a photo-sharing application may use facial recognition algorithms to compare faces in the photo to faces of users of the photo-sharing application. If a match is found, the application server 118 may send the photo to the user (operation 1240). The sending of the photo may be based on the indication received in operation 1210. The photo may be sent to the user as an attachment to an email, as a link operable to retrieve the photo, by causing the photo to be presented as a new image the next time the user connects to the photo-sharing application, or in some other manner.

Figure 13:
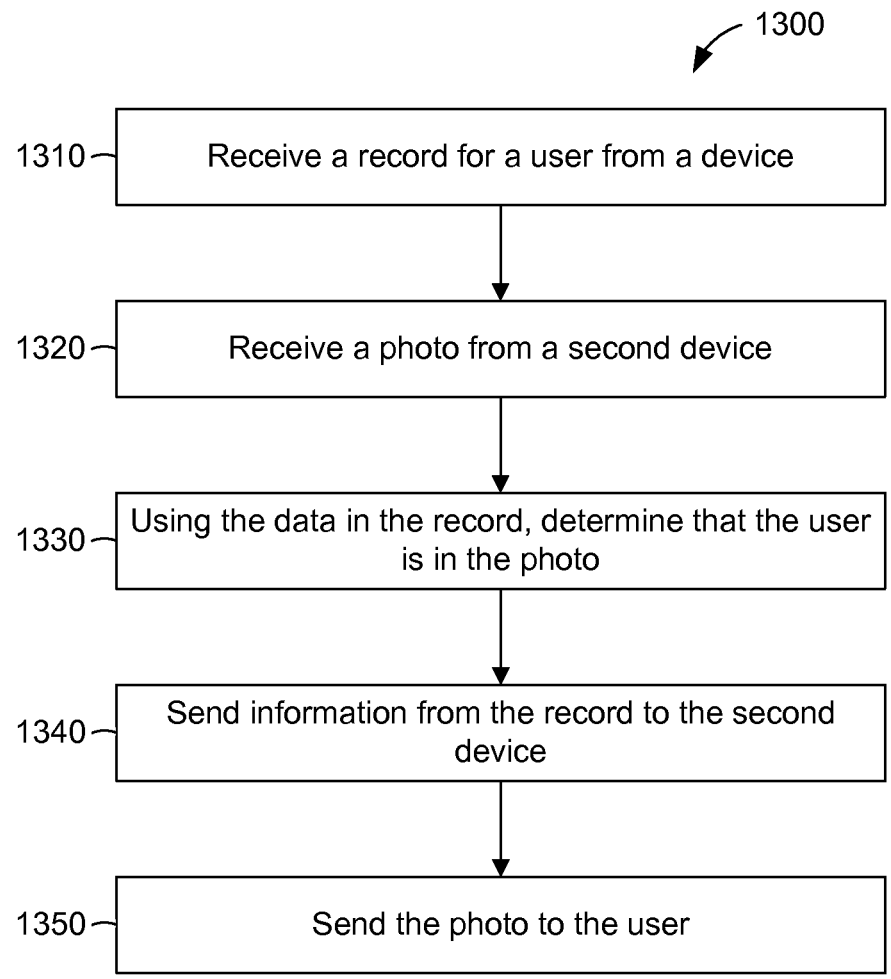

FIG. 13 is a flowchart illustrating operations of an application server 118 in performing methods of sending a picture, according to some example embodiments. Operations in the method 1300 may be performed by the application server 118, using modules described above with respect to FIG. 3. As shown in FIG. 13, the method 1300 includes operations such as receiving a record with information regarding a user from a device at 1310, receiving a photo from a second device at 1320, determining that the photo includes the user at 1330, sending information from the record to the second device at 1340, and sending the photo to the user at 1350.

The application server 118 can receive a record with information regarding a user from a device (operation 1310). For example, a user may have contact information for multiple other users stored on a cell phone in an address book. The contact information for each user may be stored in records, each of which includes one or more of the following: name, address, birthday, phone number, email address, social media address, occupation, age, gender, and facial recognition data. The user may upload one or more records to the application server 118, which may receive the record in operation 1310.

The application server 118 can receive a photo from a second device (operation 1320). For example, the contact information may have been uploaded from a desktop computer and the photo uploaded from a smartphone of the same user. As another example, the contact information may have been uploaded from a smartphone of one user and the photo uploaded from a smartphone of a second user.

The application server 118 can determine that the user corresponding to the record is depicted in the received photo (operation 1330). For example, the record can include facial recognition data, used by a facial recognition algorithm to identify the face of the depicted user. In various embodiments, the facial recognition data of all known users can be used, the facial recognition data of users associated with the user uploading the photo can be used, the facial recognition data of users opting to be recognized can be used, or another selection of facial recognition data can be used. The set of facial recognition data chosen can be compared to facial recognition data generated from the photo to determine if there is a match.

The application server 118 can send information from the record to the second device (operation 1340). For example, the contact information received from the first device may not be stored on the second device. To synchronize the contact information for the user between the two devices, the record may be sent, in its entirety, to the second device. As another example, the second device may request only a name for the user and the application server 118 can send only the name portion of the record to the second device.

The application server 118 can send the photo to the depicted user (operation 1350). For example, the information about the depicted user may include an email address and the application server 118 can send an email to the email address that includes the photo as an attachment. As another example, the application server 118 can post the picture on a social media area corresponding to the user of the second device, tag the depicted user in the photo, and send a notification to the depicted user (e.g., by email or via a communication function of the social media) indicating where the photo can be found.

Figure 14:
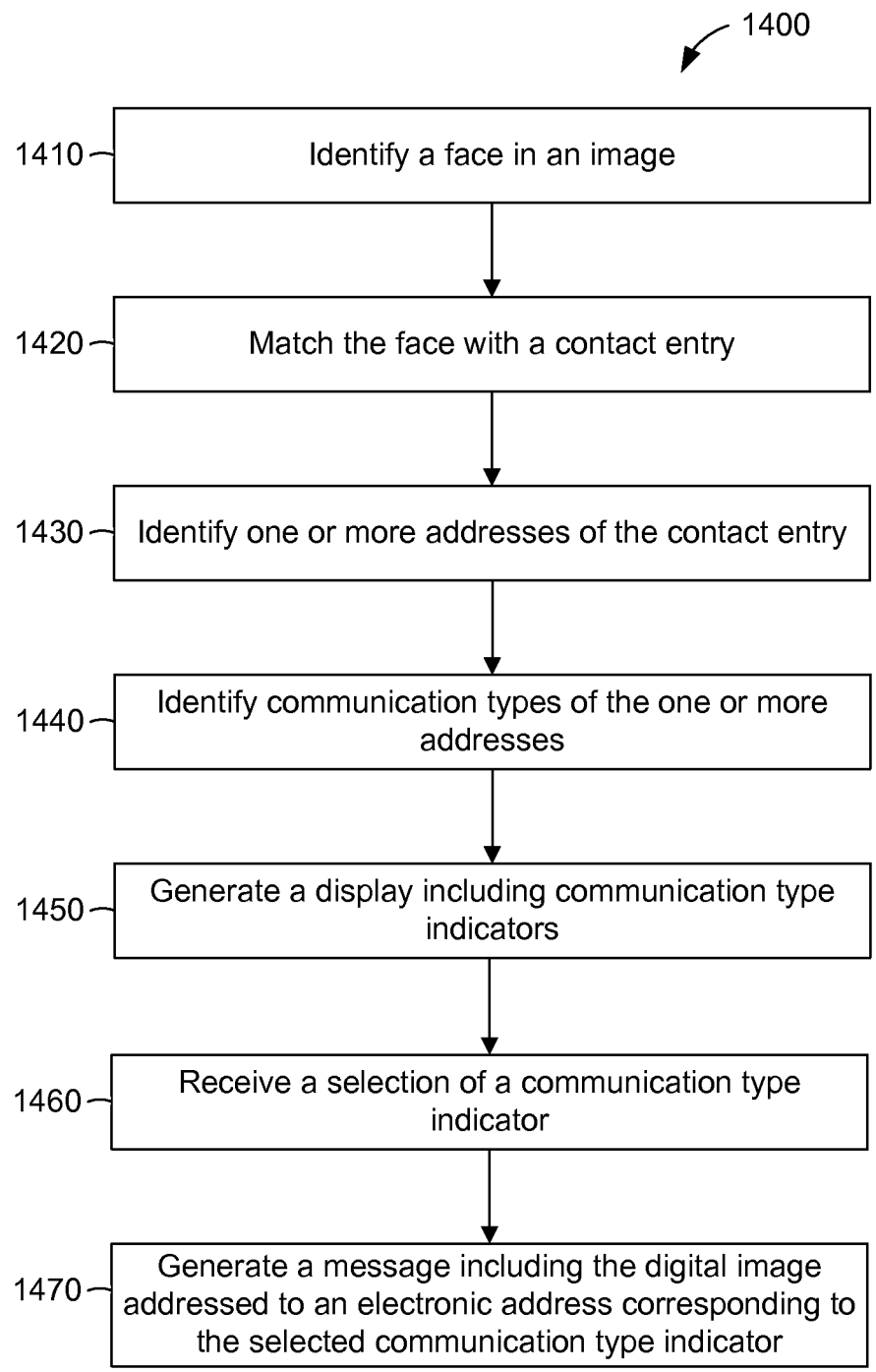

FIG. 14 is a flowchart illustrating operations of a client machine 110 or 112 in performing a method of sending digital images, according to some example embodiments. Operations in the method 1400 may be performed by the client machine 110 or 112, using modules described above with respect to FIG. 2. As shown in FIG. 14, the method 1400 includes operations such as identifying a face in a digital image at 1410, matching the face with a contact entry at 1420, identifying one or more addresses of the contact entry at 1430, identifying communication types of the one or more addresses at 1440, generating a display including communication type indicators at 1450, receiving a selection of a communication type indicator at 1460, and generating a message including the digital image at 1470.

The client machine 110 or 112 can identify a face in an image (operation 1410). For example, software running on the client machine 110 or 112 can analyze the image to determine if any faces are present in the image. The client machine 110 or 112 can further determine the location and size of each of the identified faces. Alternatively, the client machine 110 or 112 may send the image to a server over a network and receive information about one or more faces in the image in response.

The client machine 110 or 112 can match the face with a contact entry (operation 1420). For example, the portion of the image containing the face can be isolated and analyzed to extract facial recognition data. The identified facial recognition data can be compared against facial ID structures corresponding to contact entries to identify a match. For example, each contact entry may contain a facial ID structure. As another example, a database of facial ID structures may be kept separate from a database of contact entries, with each contact entry containing an identifier used to link that contact entry with one or more corresponding facial ID structures, each facial ID structure containing an identifier to link that facial ID structure with one or more corresponding contact entries, or both. Based on the match with the facial ID structure, the corresponding contact entry can be identified.

The client machine 110 or 112 can identify one or more addresses of the contact entry (operation 1430). For example, a contact entry may contain a user name, an email address, an instant messenger address, a social media address, and other physical and electronic addresses.

The client machine 110 or 112 can identify communication types of the one or more addresses of the contact entry (operation 1440). For example, some fields of a contact entry may not be populated. Thus, while all contact entries may have the ability to store an email address, an instant messenger address, and a social media address, the identified contact entry may have only an email address.

The client machine 110 or 112 can generate a display including communication type indicators (operation 1450). For example, icons may be presented that correspond to email, instant messaging, and social media. The icons corresponding to the identified communication types that correspond to the identified user may be active while the remaining icons are inactive. In some example embodiments, the inactive icons are not presented.

The client machine 110 or 112 can receive a selection of a communication type indicator (operation 1460). For example, a user using a touch screen device may touch an icon indicator. As another example, a user using a laptop or desktop computer may use a mouse to click on an indicator. In still another example, a user may select a communication type indicator from a drop-down list.

The client machine 110 or 112 can generate a message addressed to an electronic address corresponding to the selected communication type indicator (operation 1470).

The message may include the digital image analyzed in operation 1410. For example, the user may select a communication type indicator corresponding to email in operation 1460. In operation 1470, an email message addressed to an email address identified in the contract entry (in operation 1430) may be generated.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

EXAMPLE MACHINE ARCHITECTURE AND MACHINE-READABLE MEDIUM

Figure 15:
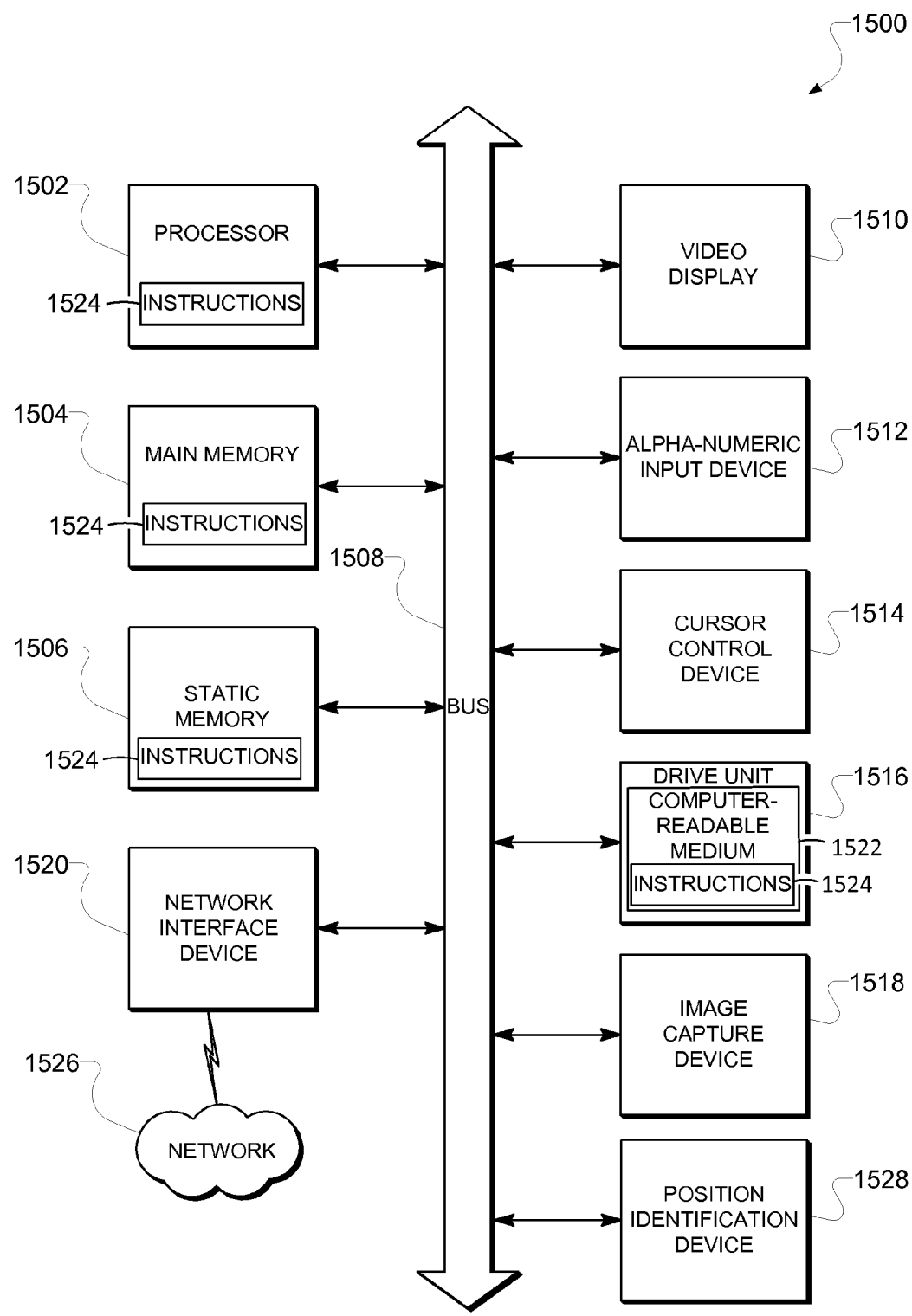
FIG. 15 is a diagrammatic representation of a machine in the example form of a computer system within which a set of instructions for causing the machine to perform any one or more of the methodologies discussed herein may be executed.

FIG. 15 is a block diagram of machine in the example form of a computer system 1500 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1504 and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard), a user interface (UI) navigation device 1514 (e.g., a mouse), a disk drive unit 1516, an image capture device 1518 (e.g., a camera), a network interface device 1520, and a position identification device 1528 (e.g., a global positioning system receiver).

Machine-Readable Medium

The disk drive unit 1516 includes a machine-readable medium 1522 on which is stored one or more sets of instructions and data structures (e.g., software) 1524 embodying or used by any one or more of the methodologies or functions described herein. The instructions 1524 may also reside, completely or at least partially, within the main memory 1504, static memory 1506, and/or within the processor 1502 during execution thereof by the computer system 1500, the main memory 1504, static memory 1506 and the processor 1502 also constituting machine-readable media.

While the machine-readable medium 1522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Transmission Medium

The instructions 1524 may further be transmitted or received over a communications network 1526 using a transmission medium. The instructions 1524 may be transmitted using the network interface device 1520 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
identifying, using a processor of a machine, a plurality of faces in an image, a first face of the plurality of faces corresponding to a first user of a plurality of users, and a second face of the plurality of faces corresponding to a second user of the plurality of users;
retrieving, based at least in part on the correspondence between the first identified face and the first user, a first address for electronic communication with the first user, the first address having a first electronic communication type;
generating a first message that includes the image, the first message being addressed to the first address;
matching, using the processor, the second face with a contact entry, the matching performed against a facial ID structure corresponding to the contact entry;
determining, based on the contact entry, that a second address for electronic communication is not present in the contact entry; and
generating, for presentation by the machine, a user interface to present a prompt for the second address for electronic communication.

2. The method of claim 1, wherein:
each face of the plurality of identified faces corresponds to a user having one or more addresses, each address having an electronic communication type of a plurality of electronic communication types, and
further comprising:
for each electronic communication type of the plurality of electronic communication types. determining a number of identified faces of the plurality of faces corresponding to users having one or more addresses corresponding to the communication type; and
presenting, on a display device, an indication of each of the electronic communication types corresponding to the addresses of the plurality of users, each indication including the number of identified faces corresponding to the electronic communication type.

3. The method of claim 2, further comprising:
receiving a selection of one of the presented indications; and
generating a second message that includes the image, the second message being addressed to the retrieved addresses corresponding to the electronic communication type corresponding to the selected indication.

4. The method of claim 1, further comprising:
prior to the identifying of the plurality of faces in the image, receiving an indication from the first user; and wherein
the generating of the first message addressed to the first address for communication with the first user is based on the indication received from the first user.

5. The method of claim 1, further comprising:
generating, for presentation by the machine, a user interface to present an option to modify the first address.

6. The method of claim 1, further comprising:
receiving, responsive to the prompt, the second address for electronic communication;
storing the second address for electronic communication in the contact entry; and
sending, using the processor, the image to the second address for electronic communication.

7. The method of claim 1, further comprising:
locating, using the processor, a third face in the image;
attempting to identify, using the processor, the third face; and
generating, based on failure to identify the third face, a user interface to present a selector configured to allow for a selection of a contact entry in reference to the third face.

8. The method of claim 7, further comprising:
receiving, responsive to the selector, the selection of the contact entry;
adding facial recognition data describing the third face to the contact entry;
retrieving a third address for electronic communication from the contact entry; and
sending, using the processor, the image to the third address for electronic communication.

9. A system comprising:
a memory; and
one or more processors coupled to the memory and configured to perform operations comprising:

identifying a plurality of faces in an image, a first face of the plurality of faces corresponding a first user of a plurality of users, a second face of the plurality of faces corresponding to a second user of the plurality of users;

retrieving, based at least in part on the correspondence between the first identified face and the first user, a first address for electronic communication with the first user, the first address having a first electronic communication type;

generating a first message that includes the image, the first message being addressed to the first address;

matching, using the processor the second face with a contact entry, the matching performed against a facial ID structure corresponding to the contact entry;

determining, based on the contact entry, that a second address for electronic communication is not present in the contact entry; and generating, for presentation by the system, a user interface to present a prompt for the second address for electronic communication.

10. The system of claim 9, wherein:
each face of the plurality of identified faces corresponds to a user having one or more addresses, each address having an electronic communication type of a plurality of electronic communication types; and
the operations further comprise:
  for each electronic communication type of the plurality of electronic communication types. determining a number of identified faces of the plurality of faces corresponding to users having one or more addresses corresponding to the communication type; and
  presenting, on a display device, an indication of each of the electronic communication types corresponding to the addresses of the plurality of users, each indication including the number of identified faces corresponding to the electronic communication type.

11. The system of claim 10, wherein the operations further comprise:
receiving a selection of one of the presented indications; and
generating a second message that includes the image, the second message being addressed to the retrieved addresses corresponding to the electronic communication type corresponding to the selected indication.

12. The system of claim 9, wherein the operations further comprise:
prior to the identifying of the plurality of faces in the image, receiving an indication from the first user; and wherein
the generating of the first message addressed to the first address for communication with the first user is based on the indication received from the first user.

13. The system of claim 9, wherein the operations further comprise:
generating, for presentation on a display device, a user interface to present an option to modify the first address.

14. The system of claim 9, wherein the operations further comprise:
receiving, responsive to the prompt, the second address for electronic communication;

storing the second address for electronic communication in the contact entry; and
sending, using the processor, the image to the second address for electronic communication.

15. The system of claim 9, wherein the operations further comprise:
locating a third face in the image;
attempting to identify the third face; and
generating, based on failure to identify the third face, a user interface to present a selector configured to allow for a selection of a contact entry in reference to the third face.

16. The system of claim 15, wherein the operations further comprise:
receiving, responsive to the selector, the selection of the contact entry;
adding facial recognition data describing the third face to the contact entry;
retrieving a third address for electronic communication from the contact entry; and
sending the image to the third address for electronic communication.

17. A non-transitory machine-readable medium having instructions embodied thereon, which, when executed by one or more processors of a machine, cause the machine to perform operations comprising:
identifying a plurality of faces in an image, a first face of the plurality of faces corresponding a first user of a plurality of users, a second face of the plurality of faces corresponding to a second user of the plurality of users;
retrieving, based at least in part on the correspondence between the first identified face and the first user, a first address for electronic communication with the first user, the first address having a first electronic communication type;
generating a first message that includes the image, the first message being addressed to the first address;
matching the second face with a contact entry, the matching performed against a facial ID structure corresponding to the contact entry;
determining, based on the contact entry, that a second address for electronic communication is not present in the contact entry; and
generating, for presentation by the machine, a user interface to present a prompt for the second address for electronic communication.

18. The non-transitory machine-readable of claim 17, wherein:
each face of the plurality of identified faces corresponds to a user having one or more addresses, each address having an electronic communication type of a plurality of electronic communication types; and
the operations further comprise:
  for each electronic communication type of the plurality of electronic communication types, determining a number of identified faces of the plurality of faces corresponding to users having one or more addresses corresponding to the communication type; and
  presenting, on a display device, an indication of each of the electronic communication types corresponding to the addresses of the plurality of users, each indication including the number of identified faces corresponding to the electronic communication type.

* * * * *